(12) United States Patent
Rada

(10) Patent No.: US 8,343,272 B2
(45) Date of Patent: Jan. 1, 2013

(54) LIGHTWEIGHT CONSTRUCTION MATERIAL AND METHODS AND DEVICE FOR FABRICATION THEREOF

(76) Inventor: David C. Rada, Lake Quivira, KS (US); Christine L. Rada, legal representative, Lake Quivira, KS (US)

( * ) Notice: Subject to any disclaimer, the term of this patent is extended or adjusted under 35 U.S.C. 154(b) by 281 days.

(21) Appl. No.: 12/799,562

(22) Filed: Apr. 27, 2010

(65) Prior Publication Data

US 2010/0276837 A1 Nov. 4, 2010

Related U.S. Application Data

(60) Provisional application No. 61/214,896, filed on Apr. 29, 2009.

(51) Int. Cl.
*C04B 7/04* (2006.01)
(52) U.S. Cl. ........ 106/644; 106/713; 106/724; 106/772; 106/778
(58) Field of Classification Search .................. 106/644, 106/713, 724, 772, 778
See application file for complete search history.

(56) References Cited

U.S. PATENT DOCUMENTS

| | | | |
|---|---|---|---|
| 4,175,159 A | 11/1979 | Raleigh | |
| 4,304,704 A | 12/1981 | Billings | |
| 4,446,040 A | 5/1984 | Samanta | |
| 4,454,267 A | 6/1984 | Williams | |
| 5,647,180 A | 7/1997 | Billings et al. | |
| 5,795,380 A | 8/1998 | Billings et al. | |
| 5,942,562 A | 8/1999 | Billings | |
| 5,964,934 A | 10/1999 | Englert | |
| 6,230,409 B1 | 5/2001 | Billings et al. | |
| 6,964,801 B1 | 11/2005 | Bretschneider et al. | |
| 6,969,423 B2 | 11/2005 | Li et al. | |

OTHER PUBLICATIONS

*Silane Coupling Agents*, Chapter 8: Other Applications of Silane Coupling Agents, pp. 221-231, by Edwin p. Plueddemann, Plenum Publishing Corporation; date of publication unknown.
*Silane Coupling Agents*, Chapter 2: Chemistry of Silane Coupling Agents, pp. 30-31 and Chapter 7: Particulate-Filled Composites, pp. 214-219, by Edwin p. Plueddemann, Plenum Publishing Corporation; date of publication unknown.
*Synthesis of Siloxane-Containing Polyimide Membranes and Their Permselectivity of Hydrocarbon by Pervaporation*, by Tsutomu Nakagawa and Kazuhiko Fujumoto, for Presentation at the ALCh E 1995 Annual Meeting, Nov. 12-17, 1995.
*Synthesis and Formation of Siloxane-Containing Membranes and IPNS via Ring Opening Polymerization*, by Israel Cabasso, et al., Polymer Research Institute, State University of New York-ESF, Syracuse, NY, date of publication unknown.
*Poly(dimethyl siloxane) Reactor Experiments for the Unit Operations Laboratory*, by Gerard T. Caneba, et al., Department of Chemical Engineering, Michigan Technological University, Proceedings of the American Institute of Chemical Engineers Annual Meeting, Session 313, Austin, Texas, Nov. 2004.

(Continued)

*Primary Examiner* — Paul Marcantoni
(74) *Attorney, Agent, or Firm* — John C. McMahon

(57) ABSTRACT

A lightweight construction material, a method of fabricating building panels utilizing said material and device therefore. The formulation utilizes silicone-treated expanded perlite in combination with cement, alpha gypsum, polyvinyl alcohol fibers and powder, and water. Building panels are formed utilizing fiber mesh to reinforce them while minimizing their weight. The building panel may be formed with one layer or two layers of different formulations.

9 Claims, 4 Drawing Sheets

OTHER PUBLICATIONS

*Covalently Attached Monolayers of Oligo (dimethylsiloxane)s on Silica: A Siloxane Chemistry Approach for Surface Modification*, by Alexander Fadeev, et al., Department of Chemistry and Biochemistry, Seton Hall University, Dec. 17, 2001.

*Inorganic Cement for Mine Roof-Bolt Grouting*, by R.E. Simpson, et al., U.S. Bureau of Mines, Report of Investigations, Nos. 8485-8500, 1980-81.

*Silicon-Containing Polymers*, The Science and Technology of Their Synthesis and Applications, by Richard G. Jones, et al., Kluwer Academic Publishers, date of publication unknown.

*Fabrication of novel mesoporous dimethylsiloxane-incorporated silicas*, by Jin Joo, et al., The Royal Society of Chemistry, 1487-1488, 2000.

*Sample Preparation to Sintered Steel and Iron*, Ullmann's Encyclopedia of Industrial Chemistry, vol. 32, pp. 543-544, Sections 3.5. Formulation and 3.6. Applications., date of publication unknown.

LIGHTWEIGHT CONSTRUCTION MATERIAL AND METHODS AND DEVICE FOR FABRICATION THEREOF

CROSS-REFERENCE TO RELATED APPLICATIONS

This application claims the benefit of U.S. Provisional Patent Application Ser. No. 61/214,896, filed Apr. 29, 2009 and incorporated by reference herein.

BACKGROUND OF THE INVENTION

The present invention is directed to a lightweight construction material. The material may be formed into panels of varying sizes.

Typical building panels of gypsum or the like tend to be comparatively heavy and weak and may not have sufficient fire resistance. The present material may be formed into various lightweight configurations, including prefabricated building panels. Previous building panel configurations that have been formulated to be lighter in weight have not been able to be produced with consistent characteristics.

One material used to reduce weight in building materials is perlite, which is a generic term for naturally occurring siliceous rock. When perlite is heated to a suitable point in its softening range (about 1600° F.), it pops in a manner similar to popcorn as the combined water vaporizes and the perlite expands from four to twenty times its original volume. This expansion is due to the presence of two to six percent combined water in the crude perlite rock. Because of perlite's insulating characteristics and light weight, it is widely used as a loose-fill insulation in masonry construction. In such an application, the loose-fill perlite insulation is poured into the cavities of concrete block.

In past applications, water absorbent perlite powder has been utilized, and this powder absorbs water in a variable and imprecise manner. This makes the resulting material heavier and weaker due to the presence of retained water after the material has set. There exists a need for a formulation and method of producing lightweight construction material that insulates and can be fabricated into building panels.

SUMMARY OF THE INVENTION

The present invention provides a lightweight construction material, a method of fabricating building panels utilizing said material, and a device for fabricating the building panels utilizing said material. The formulation utilizes silicone treated expanded perlite that has been treated with silicone to make it hydrophobic such that it absorbs little or no water. The perlite is used in combination with cement, alpha gypsum, polyvinyl alcohol fibers and powder, and water. Building panels are formed utilizing fiber mesh to reinforce them while minimizing their weight. The building panel may be formed with one layer or multiple layers of different formulations.

OBJECTS AND ADVANTAGES OF THE INVENTION

Therefore, the objects of the present invention are to provide a formulation for a lightweight construction material that is strong, waterproof, mold-proof, fireproof, and insect-proof; to provide such a formulation that utilizes a combination of cement, alpha gypsum, polyvinyl alcohol fibers and powder, and water to create a lightweight construction material including expanded perlite that is silicone treated to make it water resistant; to provide such a formulation that may be fabricated into building panels utilizing fiber mesh for reinforcement; to provide such a formulation that may be fabricated with multiple layers of material and/or fiber mesh; to provide such a construction material that is relatively easy to manufacture and inexpensive to produce; and to provide such a construction material that is particularly well adapted for the intended usage thereof; to provide a device to easily and cheaply, and at least semi-automatically fabricate the building panels.

Other objects and advantages of this invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
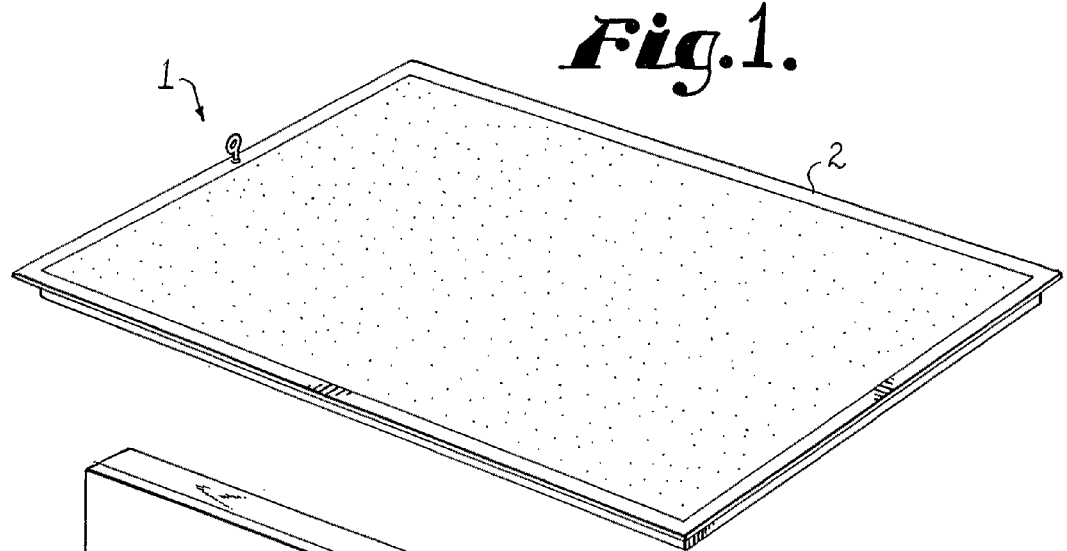
FIG. 1 is a perspective view of a mold for fabricating a building panel using the lightweight construction material in accordance with the present invention.

FIG. 1 generally illustrates a new building panel 1 formed into a building panel 1 by means of a mold 2. The building material formulation may be applied as a lightweight construction wall forming material or as an insulation layer, with the formulation being varied accordingly, as explained below.

A lightweight aggregate is made hydrophobic by silicone treatment. Silicone treated expanded perlites are well suited for this application. Other highly porous aggregates such as volcanic stone can be treated with silicone to render them hydrophobic for use in this system.

Alpha gypsum cement binder provides strength to the lightweight construction material forming the panel 1. Appropriate alpha gypsum is high-density gypsum available from U.S. Gypsum Company under the trademark "Hydro-Stone." A solution of potassium sulfate may be used to speed set times of the formulation.

Polyvinyl alcohol ("PVA") fiber is added for strength and long-term crack control. PVA powder is added to decrease brittleness of the material to prevent fasteners from cracking the material when such fasteners are used with to a fabricated panel 1.

To prepare the formulation for the lightweight construction material, cement and alpha gypsum are mixed together and sifted. Thereafter, PVA fiber and powder and silicone treated expanded perlite are added to the formulation. The resulting dry formulation is mixed for 2 to 3 minutes and then water is added to the dry formulation before it is poured into an appropriate mold.

The material may be poured into a mold 2 of desired shape, and typically that of a finished building panel 1. As the material sets, the liquid evaporates or chemically changes, and the component materials are bound together to provide a rigid panel 1 in the shape of the mold. Using this method, panels 1 may be fabricated either at a factory or at a construction site.

Figure 3:
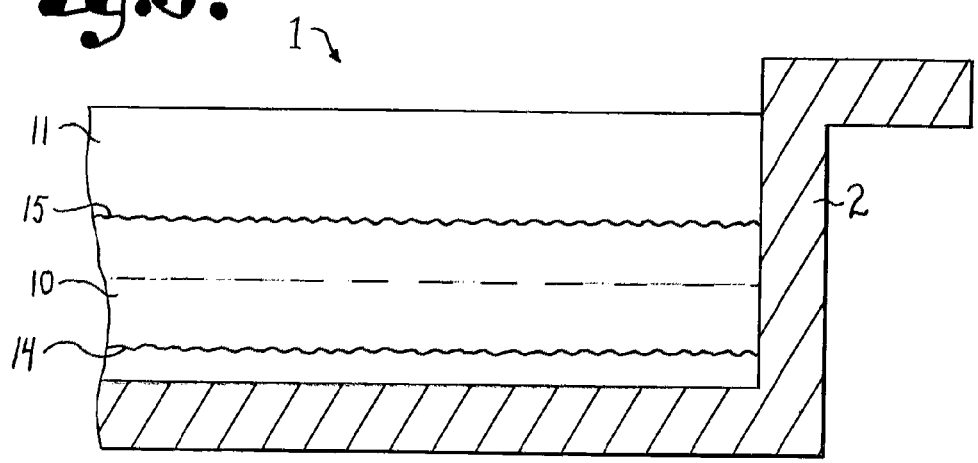
FIG. 3 is an enlarged, fragmentary side view of a portion of the mold showing layers of fabrication.

A panel 1 measuring 8 feet by 4 feet by ½ inch may be constructed with one or two powder formulations in one or two layers with fiberglass reinforcing mesh in each layer. Shown in FIG. 3 is a panel 1 that is formed with two layers, a bottom layer 10 and a top layer 11. The bottom layer 10 comprises of a mixture of white cement, gypsum, silicone-treated expanded perlite, PVA fibers, PVA powder, and a specific volume of water. The bottom layer 10 represents the inside finished surface of the panel 1 when installed in a vertical orientation. The top layer 11 comprises of a mixture of gray cement, calcium aluminate (CaAl) cement, silicone-treated expanded perlite, PVA fibers, PVA powder, and a specific volume of water. The top layer 11 represents the backside surface of the panel 1 when installed in a vertical orientation. The CaAl cement shortens the set time, as does the gypsum in the top layer 11.

The mold 2 is designed such that a fiberglass mesh 14 is held taut approximately ⅛ inch above the bottom of the mold 2. The powder formula for the bottom layer of the panel is mixed with the appropriate amount of water and dispensed onto the fiberglass mesh 14. With electromechanical vibration, the mixture passes through the fiberglass mesh 14 onto the bottom of the mold 2 and is distributed relatively uniformly throughout the panel 1. The mesh size determines how much of the PVA fiber passes through the mesh 14 into the bottom layer. The PVA fiber is approximately 8 mm long (≈3/16 inch), so the ideal mesh size should be equal to or greater than 8 mm.

Figure 2:
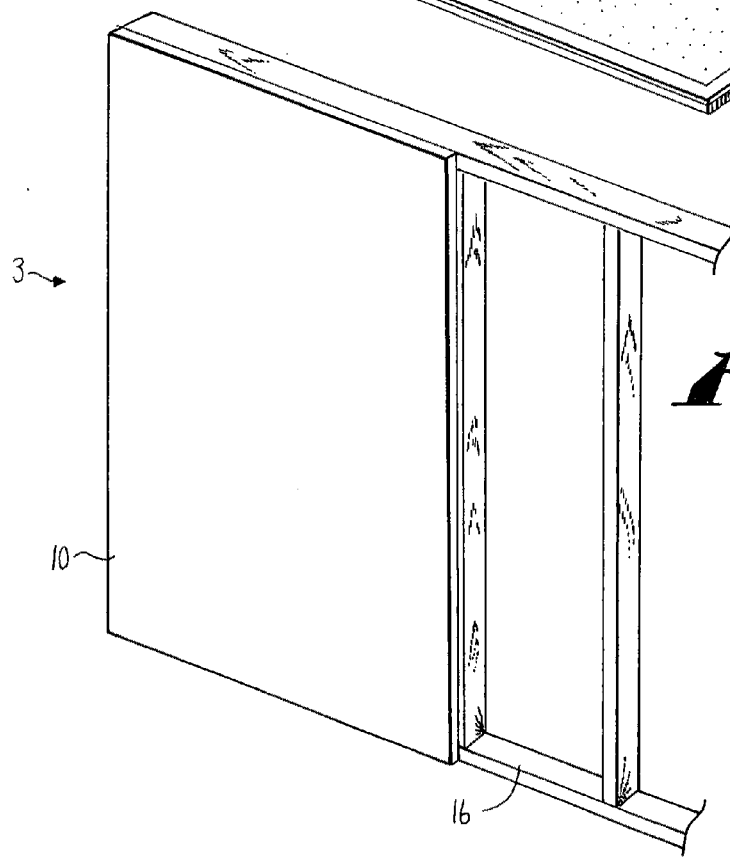
FIG. 2 is a perspective view of a building panel fastened to a building framework.

Once the bottom layer 10 has been poured, the top layer 11 formulation is mixed with the appropriate amount of water. The top layer 11 is poured into the mold 2 approximately 15 minutes after the bottom layer 10 is poured to allow the bottom layer to begin to set. The top layer formulation is placed onto the bottom layer and distributed by means of a pneumatically vibrating roller. Once the top layer 11 is in place, a fiberglass mesh 14 is placed on the backside and pushed into the cementitious mixture. After full setting and solidification, the fabricated panel 1 may be fastened to a building framework 16 by appropriate fasteners, such as masonry screws (not shown), as illustrated in FIG. 2.

An approximate formula for fabricating a panel 1 of the construction material that is 8 feet by 4 feet by ½ inch thick is:
Bottom Layer 10—(Inside Layer) (White)
  White cement (Portland Types I or II, or mixture) 20.48 lbs.
  Alpha gypsum (Hydro-Stone) 4.57 lbs.
  Silicone treated expanded perlite 5.7 lbs.
  Water 9,142 ml
  PVA fiber 0.285 lbs.
  PVA powder 0.113 lbs.
Top Layer 11—(Outside Layer) (Gray)
  Gray cement (Portland Types I or II, or mixture) 25.6 lbs.
  Calcium aluminate cement 2.86 lbs.
  Silicone treated expanded perlite 8.57 lbs.
  Water 14,856 ml
  PVA fiber 0.36 lbs.
  PVA powder 0.14 lbs.

A lightweight construction panel 1 constructed in either one layer or two layers as described above is substantially lighter than a conventional concrete building panel. Conventional panels normally weigh over 50 pounds per square foot of surface area; the lightweight construction panel 1 weighs less than 2 pounds per square foot of surface area. The amounts of ingredients may be varied according to strength and weight requirements.

If additional strength of the panel 1 is desired, a structural lattice grid can be placed on the panel 1 by placing a dry powder compound of cement and alpha gypsum in a crosshatch pattern through a crosshatched dispensing guide. Such a dispensing guide is formed with a crosshatch pattern formed therethrough, thereby allowing the powder to pass through the crosshatched opening and be distributed in said pattern into the top layer 11 of the panel 1. The dispensing guide is removed from the panel 1, and the mixture hardens in a structural crosshatch pattern. This method will provide additional structural strength without adding the weight of a full layer of material.

The silicone treated expanded perlite is important to the final characteristics of the panel 1. Treating the expanded perlite to make it non-water absorbent, both substantially strengthen the overall formulation and reduces absorption of water by the perlite such that the final overall weight of the panel is reduced approximately by an amount equivalent to the amount of water that would be absorbed by non-treated expanded perlite compared to the treated hydrophobic expanded perlite.

Figure 4:
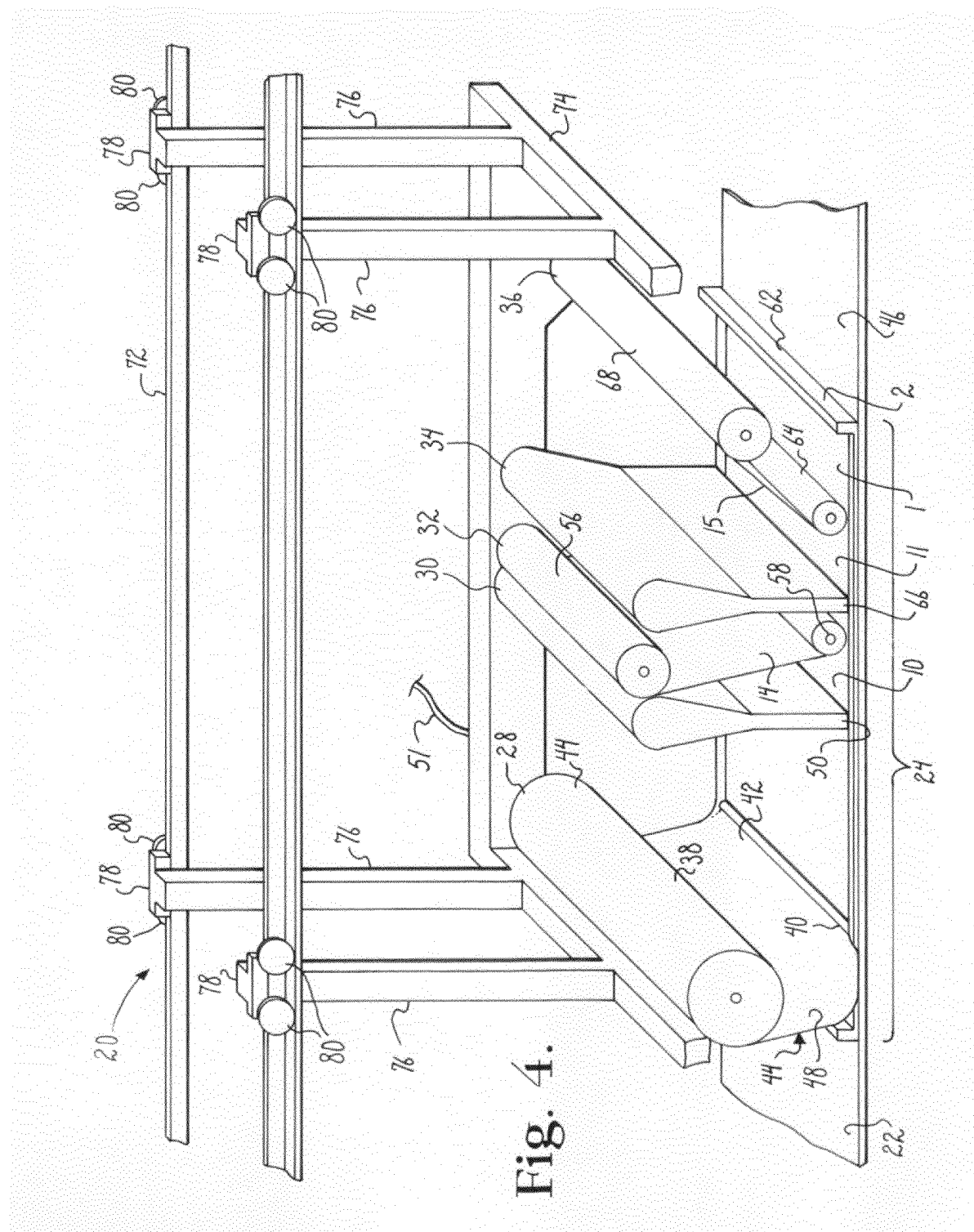
FIG. 4 is a perspective view of a device for fabricating the building panel of FIG. 1.
Figure 5:
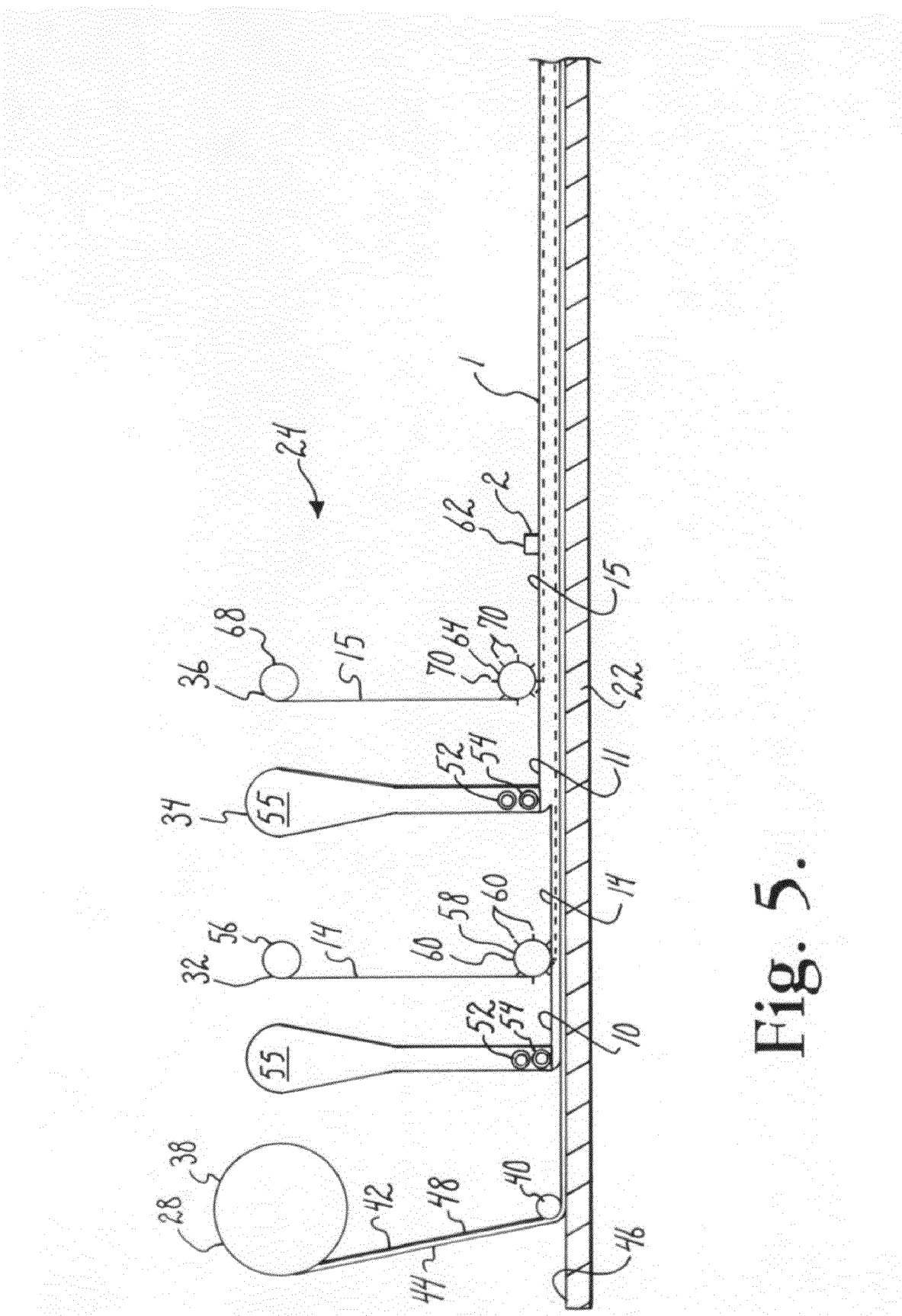
FIG. 5 is a cross-sectional view of a portion of the device for fabricating the building panel of FIG. 1.

Referring now to FIGS. 4 and 5, a device for fabricating the lightweight building panels 1 of the illustrated embodiments generally referred to by the numeral 20. The device 20 includes a receiving board 22 including a length and width, a fabrication subassembly 24 and a rolling support subassembly 26 that is configured and arranged to support the fabrication subassembly 24 above the receiving board 22, and to transport the fabrication subassembly 24 along the length of the receiving board 22, such that a building panel 1 can be fabricated on the receiving board 22.

The receiving board 22 is a structure having a surface upon which the building panels 1 can be manufactured. For example, the receiving board 22 can be a table, a counter or a belt conveyor system. The receiving board 22 includes a width equal to at least the width of the building panel 1 and a length equal to at least the length of the building panel 1. In some circumstances, the receiving board 22 is sized and shaped to accommodate a single building panel 1. In other circumstances, the receiving board 22 is sized and shaped to accommodate two or more building panels 1. In still other circumstances, the receiving board 22 is a conveyor system configured and arranged for sequential and continuous manufacture of the building panels 1, such that the conveyor system conveys completed panels to a finishing area, or such that the fabrication subassembly 24 is held stationary and the conveyor moves the building panel being fabricated down a line of fabrication subassembly 24 components, such that the building panel 1 components are applied sequentially. In some circumstances, a mold 2, such as described elsewhere herein, can be supported (e.g., placed, located, received) on the receiving board 22, such as to sequentially receive the building panel component materials therein.

The fabrication subassembly 24 includes a backing dispenser 28, a first composition dispenser 30, a lower mesh dispenser 32, a second composition dispenser 34, and an upper mesh dispenser 36, which are serially arranged with respect to the length of the receiving board 22, and/or the order their respective materials are applied to fabricated such a building panel 1. Accordingly, the components of the fabrication subassembly 24 can dispense (e.g., apply) their respective materials onto the receiving board 22 in sequential order, such as described in greater detail below.

The backing dispenser 28 is located over the receiving board and includes a backing dispensing reel 38 and an application roller 40. The backing dispensing reel 38 holds a roll of backing paper 42, such that the backing paper 42 is unrolled from the backing dispensing reel 38 and passes under the application roller 40. Accordingly, a first surface (e.g., outer surface) 44 of the backing paper 42 contacts the upper surface 46 of the receiving board 22 and a second surface 48 of the backing paper 42 contacts the application roller 40. Accordingly, as the fabrication subassembly 24 is conveyed along a length of the receiving board 22, the backing paper 42 is laid down thereon.

The first composition dispenser 30 is located adjacent to the backing dispenser 28, such that a first (e.g., bottom, outer) layer 10 of the composition (e.g., of the type described elsewhere herein) is deposited on the backing paper 42. The first composition dispenser 30 includes an elongated dispensing orifice 50 located between about 0.1 inches and about 0.5 inches above the receiving board 22, depending upon the desired thickness of a completed building panel 1. For example, in one embodiment, if the desired final thickness is 0.5-inches, then the elongated dispensing orifice 50 is located about 0.25-inches above the receiving board 22. In some embodiments, the elongated dispensing orifice 50 has a length approximately equal to the width of the finished building panel and is oriented perpendicularly to the length of the receiving board 22, such that the elongated dispensing orifice 50 extends across the width of the backing paper 42 or of a mold 2 received on the receiving board 22. In other embodiments, the elongated dispensing orifice 50 has a length approximately equal to the length of the finished building panel and is oriented parallel to the length of the receiving board 22, such that the elongated dispensing orifice 50 extends across the length of the receiving board 22, the backing paper 42 or of the mold 2. The elongated dispensing orifice 50 includes a width from about 0.1-inches to about 2.0-inches. The width of the elongated dispensing orifice 50 is selected such that the elongated dispensing orifice 50 cooperates with a pressurized manifold 51 (discussed below) located in the first composition dispenser 30, and optionally with the rate at which the fabrication subassembly 24 is moved across the receiving board 22, such that a first layer 10 of the desired thickness is fabricated.

The first composition dispenser 30 includes the pressurized manifold 51 and a pair of opposing augers 52 and 54 configured and arranged to evenly deliver a composition 55 for making the panel 1 to the elongated dispensing orifice 50. A first auger 52 of the pair of opposing augers includes a helical clockwise rotating flighting and the second auger 54 of the pair of opposing augers includes a counter-clockwise helical rotating helical flighting, such as is known in the art. As the augers 52 and 54 rotate, the first composition 55 is evenly dispersed across (e.g., delivered to) the length and width of the elongated dispensing orifice 50. In some embodiments, the first composition dispenser 30 includes a vibrator configured and arranged to assist in the even feeding of the composition 55 to the elongated dispensing orifice 50 and to remove bubbles from the composition 55. Accordingly, the first composition dispenser 30 can apply a thin, smooth layer of the first composition 55 evenly across and along the backing paper 42.

The lower mesh dispenser 32 is located adjacent to the first composition dispenser 30 and is configured and arranged to apply a lower fiberglass mesh 14 to the first layer 10, as described elsewhere herein. The lower mesh dispenser 32 includes a lower mesh dispensing reel 56 that includes a roll of the fiberglass mesh 14 and a lower mesh roller 58. The lower mesh 14 is unrolled from the dispensing reel 56 and passes under the lower mesh roller 58, where is contacts the previously dispensed first composition layer 10. The lower mesh roller 58 includes a plurality of fingers 60 (e.g., teeth, hooks, or pins) and contacts the previously dispensed first layer 10 of the composition. The fingers 60 are sized, shaped and arranged to grasp and or push the first mesh 14, such as by poking through holes of the mesh 14, and to assist in drawing the mesh 14 downward off of the reel 56. The distance between the lower mesh roller 58 and receiving board 22 determines, at least in part, the location of the lower mesh 14 in the finished building panel 1. For example, the lower mesh roller 58 is located above the receiving board 22 such that an applied lower mesh 14 is located at about ⅓ the final thickness of a completed lightweight building panel 1.

In circumstances when a mold 2 is used to fabricate the building panels 1, the mold 2 (or the receiving board 22) may include a tensioning board 62 that is attached to a first end of the lower mesh 14 (and also to the upper mesh 15), such that the lower mesh 14 is suspended, and preferably held taut, between the tensioning board 62 and the lower mesh roller 58. The upper mesh 15 can be similarly suspended between the tensioning board 62 and the upper mesh roller 64 described below.

The second composition dispenser 34 is constructed similarly to the first composition dispenser 30, is joined to the pressurized manifold 51 and a pair of augers 52 and 54, except that the second composition dispenser 34 is configured and arranged to dispense the second layer 11 (e.g., inner layer, top layer) of composition 55 onto the first or bottom layer 10, such as described elsewhere herein. The second composition dispenser 34 is located adjacent to the lower mesh dispenser 32 and includes an elongated dispensing orifice 66 located between about 0.1 inches and about 0.5 inches above a dispensed first layer 10 of a composition, depending upon the desired final thickness of the building panel 1. Like the elongated dispensing orifice 50 of first composition dispenser 30, in some embodiments, the elongated dispensing orifice 66 of the second composition dispenser 34 has a length approximately equal to the width of the finished building panel and is oriented perpendicularly to the length of the receiving board 22, such that the elongated dispensing orifice 66 extends across the width of the backing paper 42 or of mold 2. In other embodiments, the elongated dispensing orifice 66 of the second composition dispenser 34 has a length approximately equal to the length of the finished building panel and is oriented parallel to the length of the receiving board 22, such that the elongated dispensing orifice 66 extends across the length of the receiving board 22, of the backing paper 42 or of mold 2.

The upper mesh dispenser 36 is located adjacent to the second composition dispenser 34, and is configured and arranged to apply the upper fiberglass mesh 15 to the second layer 11 of the building panel 1. The upper mesh dispenser 36 includes an upper mesh dispensing reel 68, from which the upper mesh 15 is unrolled, and an upper mesh roller 64. Like the lower mesh roller 58, the upper mesh roller 64 includes a plurality of fingers 70 configured and arranged to assist in rolling out the second fiberglass mesh 15 by gripping the mesh 15 and rolling such that the mesh 15 contacts the second layer 11. The upper mesh roller 64 contacts a dispensed second layer 11 of the composition 55 and optionally pushes the mesh 15 into the second layer 11. For example, the upper mesh roller 64 is located above the receiving board 22 such that an applied upper mesh 15 is located at about ⅔ the final thickness of a completed lightweight building panel 1. In some circumstances, the upper mesh roller 64 is located a distance above the receiving board 22 such that it pushes the mesh 15 into the second layer 11 as the mesh 15 is dispensed (e.g., applied).

As discussed above, the device 20 includes a rolling support subassembly 26 that is configured and arranged to support the fabrication subassembly 24 above the receiving board 22, such that the fabrication subassembly 24 can be moved across (e.g., back and forth) the upper surface 46 of the receiving board 22 and building panels 1 can be fabricated thereon in a single pass and thereafter used as is or cute to a preferred size. The rolling support subassembly 26 can include a motor and electronics, for automatically moving the fabrication subassembly 24, or can be moved manually.

In some circumstances, the rolling support subassembly 26 is attached to the ceiling of a manufacturing building, or another support structure, while in other circumstances it is foreseen that the rolling support subassembly 26 can be free-standing and includes a plurality of rigid legs. In the embodiment shown in FIG. 4, the rolling support subassembly 26 is attached to the fabrication subassembly 24 and located over the receiving board 22, whereby the fabrication subassembly 24 is suspended over the receiving board 22, and wherein the rolling support subassembly 26 includes a trolley roller system aligned with the receiving board 22. Namely, the rolling support subassembly 26 includes a pair of roller beams 72 from which a support apparatus 74 is suspended. The support apparatus 74 is suspended from the pair of roller beams 72 via a plurality of arms 76 ending in trolley rollers 78. The trolley rollers 78 each include a plurality of wheels 80 configured and arranged to engage one of the pair of roller beams 72, such that the rolling support subassembly 26 can move back and forth along the length of the receiving board 22. A variety of such rolling conveyance systems are known in the art.

The pressure manifold 51 flow receives composition 55 by gravity or from a conventional pump (not shown) and delivers the composition 55 to the interior of the dispensers 32 and 34.

It is to be understood that while certain forms of the present invention have been illustrated and described herein, it is not to be limited to the specific forms or arrangement of parts described and shown.

The invention claimed is:

1. A composition for use as a lightweight construction material comprising:
   a) white cement;
   b) alpha gypsum;
   c) silicone coated expanded perlite;
   d) polyvinyl alcohol fiber;
   e) polyvinyl alcohol powder; and
   f) water.

2. The composition to claim 1 wherein said composition includes potassium sulfate.

3. The composition according to claim 1, wherein said composition is formulated in mixture comprising white cement therein in the amount of approximately 40% by weight, alpha gypsum therein in the amount of approximately 9% by weight, silicone coated expanded perlite therein in the amount of approximately 11% by weight, water therein in the amount of approximately 39% by weight, and polyvinyl alcohol fiber and polyvinyl alcohol powder therein each in an amount less than 1% by weight.

4. The composition according to claim 1, wherein said composition includes calcium aluminate.

5. A mixture comprising white cement in an amount of approximately 36% by weight, calcium aluminate in an amount of approximately 4% by weight, silicone coated expanded perlite in an amount of approximately 12% by weight, water in an amount of approximately 47% by weight, and polyvinyl alcohol fiber and polyvinyl alcohol powder therein each in an amount less than 1% by weight.

6. A method of constructing a lightweight building panel comprising the steps of:
   a) mixing together white cement, alpha gypsum, silicone coated expanded perlite, polyvinyl alcohol fiber, polyvinyl alcohol powder to prepare a dry mixture;
   b) adding water to said dry mixture water to prepare a wet mixture; and
   c) pouring said wet mixture into a planar mold and allowing to cure.

7. A method of constructing a lightweight building panel comprising the steps of:
   a) mixing together white cement, alpha gypsum, silicone coated expanded perlite, polyvinyl alcohol fiber, polyvinyl alcohol powder to prepare a first dry mixture;
   b) adding water to said first dry mixture water to prepare a first wet mixture; and
   c) pouring said first wet mixture into a mold in which a first fiber mesh is extended horizontally, whereby said first wet mixture surrounds said fiber mesh forming a first layer of said panel;
   d) mixing together white cement, calcium laminate, silicone coated expanded perlite, polyvinyl alcohol fiber, polyvinyl alcohol powder to prepare a second dry mixture;
   e) adding water to said second dry mixture water to prepare a second wet mixture;
   f) pouring said second wet mixture into said planar mold in which a second fiber mesh is extended horizontally, whereby said second wet mixture surrounds said second fiber mesh forming a second layer of said panel on top of said first layer; and
   g) allowing the panel to cure and harden so as to form a solid building panel.

8. The method according to claim 7, wherein said second wet mixture is poured into said mold approximately 15 minutes after said first wet mixture is poured into said mold.

9. The method according to claim 7, wherein a dry powder compound of white cement and alpha gypsum is deposited in a crosshatch pattern on said second layer of said panel after said second wet mixture is poured into said mold and before said second wet mixture hardens.

\* \* \* \* \*